(12) United States Patent
Suzuki

(10) Patent No.: US 6,831,435 B2
(45) Date of Patent: Dec. 14, 2004

(54) VEHICLE BLOWER MOTOR DEVICE AND HOLDER FOR BLOWER MOTOR DEVICE

(75) Inventor: Akihiko Suzuki, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/677,964

(22) Filed: Oct. 1, 2003

(65) Prior Publication Data

US 2004/0084982 A1 May 6, 2004

(30) Foreign Application Priority Data

Oct. 2, 2002 (JP) ........................................ 2002-289888

(51) Int. Cl.[7] .............................................. H02K 9/00
(52) U.S. Cl. ..................... 318/483; 318/538; 310/58; 310/88; 310/89
(58) Field of Search .................. 318/483, 538, 318/254, 801; 310/58, 88, 89, 64, 67 R, 71, 60 R, 60 A; 417/354, 368

(56) References Cited

U.S. PATENT DOCUMENTS 3,751,699 A * 8/1973 Gleichman .................. 310/90
5,925,947 A * 7/1999 Kajiwara et al. .............. 310/64
6,107,708 A * 8/2000 Yamaguchi et al. .......... 310/58
6,528,919 B2 * 3/2003 Fujii et al. ..................... 310/88
2001/0052733 A1 * 12/2001 Fujii et al. ..................... 310/58

FOREIGN PATENT DOCUMENTS

JP  2000-316247  11/2000
JP  2002-204547   7/2002

* cited by examiner

Primary Examiner—Paul Ip
(74) Attorney, Agent, or Firm—Sheridan Ross PC

(57) ABSTRACT

A holder of a vehicle blower motor device includes a holder body for holding a motor, a disk-shaped coupling member, and a cover plate. The holder body, the coupling member, and the cover plate define an air duct. Air is introduced to the interior of the holder body through the air duct form the inlet to cool the motor. A cylindrical blocking wall surrounds the inlet. The blocking wall protrudes from the lower surface of the coupling member, which faces the air duct, toward the interior of the air duct. The blocking wall prevents droplets collected on the inlet from reaching a boundary between the cover plate and the coupling member. As a result, a blower motor device having an improved water resistance.

20 Claims, 4 Drawing Sheets

VEHICLE BLOWER MOTOR DEVICE AND HOLDER FOR BLOWER MOTOR DEVICE

BACKGROUND OF THE INVENTION

The present invention relates to a vehicle blower motor device and a holder for the blower motor device.

A typical blower motor device used in a vehicle air conditioning system has a direct-current motor as a power source. Since the blower motor device is continuously driven at a high power, friction between brushes and a commutator produces heat. This increases the temperature of the motor particularly at the brushes and the commutator. Therefore, to improve the quality of the motor, it is important to design the motor to suppress the temperature increase of the motor.

Japanese Laid-Open Patent Publication No. 2002-204547 discloses a blower motor device that has an air duct for taking cooling air to the interior of a motor. The air duct connects an inlet formed at a predetermined position in the blower motor device to the interior of the motor, and guides air taken at the inlet to the interior of the motor.

However, the inlet of the blower motor of the publication is opened to a side of the device and therefore cannot guide air to the interior of the motor to sufficiently cool the motor. To sufficiently cool the motor, the device may be configured as shown in FIG. 5 such that rotation of the motor, specifically rotation of a rotor attached to an output shaft of the motor, may be used to take cooling air into the interior of the motor.

That is, a motor holder 71 of a blower motor device shown in FIG. 5 holds a motor (not shown) located to the right as viewed in FIG. 5. The motor holder 71 includes a substantially circular coupling member 72 attached to a vehicle and a cover plate 73 attached to the lower side of the coupling member 72. The coupling member 72 and the cover plate 73 define an air duct 76 for guiding cooling air toward the motor. The coupling member 72 includes an inlet cylinder 75 that forms an inlet 74. The inlet cylinder 75 extends upward from the coupling member 72. The inlet 74 connects an exterior space above the motor holder 71 with the air duct 76. When rotated by the motor, a fan creates an air flow from the inlet 74 to the motor via the air duct 76 to cool the motor.

Droplets of, for example, car wash liquid, collect on the inner surface of the inlet cylinder 75. Collected droplets move along the inner surface of the inlet cylinder 75 and the inner surface of the air duct 76, and reach a boundary 77 between the coupling member 72 and the cover plate 73. Since a slight space exists at the boundary 77 between the coupling member 72 and the cover plate 73, droplets ooze out from the motor holder 71 through the boundary 77 due to a capillary phenomenon. The droplets are than sent to the passenger compartment by the air flow produced by rotation of the fan.

If air rushes in through the inlet 74, the air flow causes droplets to reach the interior of the motor. This causes the motor to malfunction.

A blower motor device disclosed in Japanese Laid-Open Patent Publication No. 2000-316247 also has an air duct for motor cooling air. The blower motor device of the publication includes a lower case attached to a motor holder. The lower case accommodates a control circuit for controlling a motor. A notch or a projection is formed at a boundary between the motor holder and the lower case. If droplets that entered the air duct reach the boundary between the motor holder and the lower case, the droplets move along the boundary. At this time, the notch or the projection blocks the droplets moving toward the control circuit along the boundary, thereby preventing the control circuit from being wet.

However, the device of the publication No. 2000-316247 allows droplets to reach the boundary between the motor holder and the lower case, and does not prevent droplets from reaching the boundary. Therefore, the device cannot eliminate the drawbacks presented by the device of FIG. 5. Also, since droplets are permitted to reach the boundary between the motor holder and the lower case, there is a possibility that droplets reach the control circuit.

SUMMARY OF THE INVENTION

Accordingly, it is an objective of the present invention to provide a vehicle blower motor device and a holder for the blower motor device that have an improved water resistance.

To achieve the foregoing and other objectives and in accordance with the purpose of the present invention, a vehicle blower motor device having a motor and a holder is provided. The holder includes a holder body, a flange, and a cover plate. The holder body accommodates and holds the motor. The flange extends radially outward from the holder body. The cover plate is attached to the flange and the holder body such that the cover plate is located below the flange. A first boundary is formed between the cover plate and the flange, and a second boundary is formed between the cover plate and the holder body. The holder body, the flange, and the cover plate define an air duct. The flange has an inlet. The inlet connects the air duct, which is located below the flange, with an outside space that is located above the flange. Air is guided from the inlet to the interior of the holder body through the air duct to cool the motor. A blocking portion is provided in the air duct and between the inlet and the first boundary. The blocking portion prevents liquid collected on the inlet from reaching the first boundary.

The present invention may also be applied to a holder in a vehicle blower motor device having a holder body, a flange, a cover plate, an air duct, and a blocking portion. The holder body accommodates and holds a motor. The flange extends radially outward from the holder body. The cover plate is attached to the flange and the holder body such that the cover plate is located below the flange. A first boundary is formed between the cover plate and the flange, and a second boundary is formed between the cover plate and the holder body. The air duct is defined by the holder body, the flange, and the cover plate. The flange has an inlet. The inlet connects the air duct, which is located below the flange, with an outside space that is located above the flange. Air is guided from the inlet to the interior of the holder body through the air duct to cool the motor. The blocking portion is provided in the air duct and between the inlet and the first boundary. The blocking portion prevents liquid collected on the inlet from reaching the first boundary.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2(*b*) is a diagrammatic front view of the motor holder;

FIG. 2(*c*) is a diagrammatic perspective view of a cover plate;

DETAILED DESCRIPTION OF THE PREFERRED EMBODIMENTS

A vehicle blower motor device according to one embodiment of the present invention will now be described with reference to FIGS. 1 to 4.

The blower motor device includes a motor holder 1 fixed to a vehicle (not shown), a blower motor 2 held by the motor holder 1, and a fan 4 fixed to a rotary shaft 3 of the blower motor 2.

Figure 1:
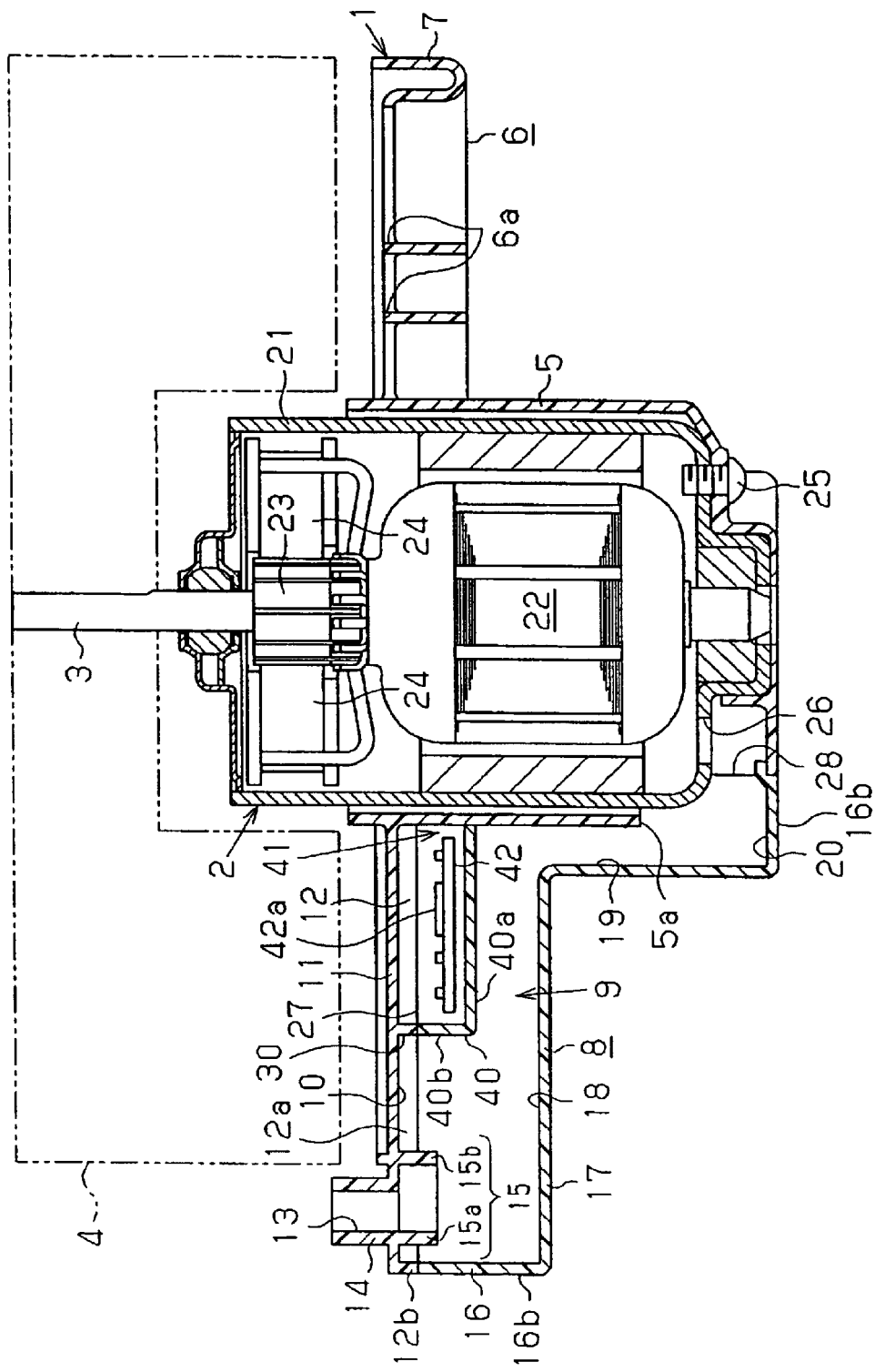
FIG. 1 is a front cross-sectional view illustrating a blower motor device according to one embodiment of the present invention.
Figure 2A:
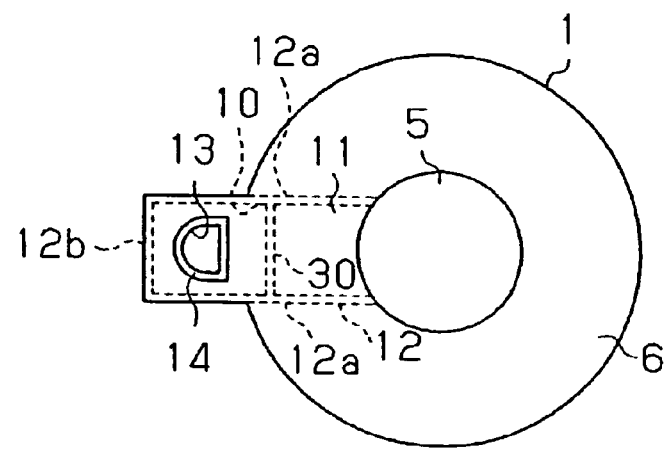
FIG. 2(*a*) is a diagrammatic plan view of a motor holder.
Figure 2B:
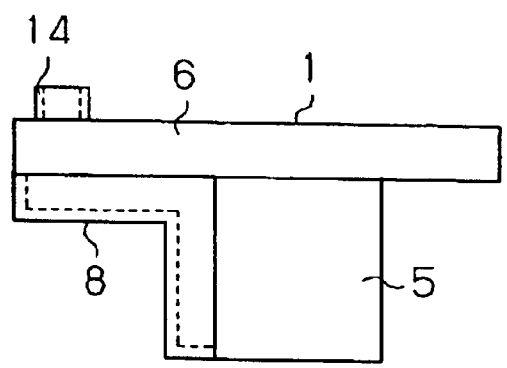
Figure 2C:
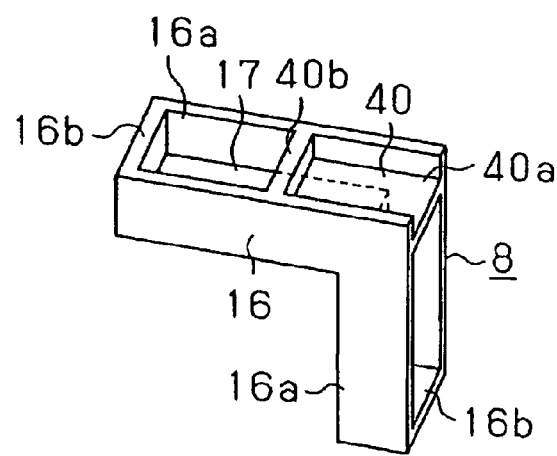

As shown in FIGS. 1, 2(*a*), and 2(*b*), the motor holder 1 is formed of resin and includes a holder body 5, a coupling member (flange) 6, a fixing ring 7, and a cover plate 8. The holder body 5 is substantially shaped as a cup to accommodate and hold the blower motor 2. The coupling member 6 is substantially shaped as a disk. The coupling member 6 is located at an axial position close to the opening of the holder body 5 and extends radially outward from the outer circumference of the holder body 5. Holes 6*a* are formed in the coupling member 6. The holes 6*a* axially extend through the coupling member 6. When the fan 4 rotates, air flows through the holes 6*a* along the axial direction of the fan 4. The fixing ring 7 is formed at the outer circumference of the coupling member 6.

The cover plate 8 is fastened to the holder body 5 and the coupling member 6 with screws such that the cover plate 8 is located radially outward of the holder body 5. The cover plate 8 partly covers the holder body 5 at a predetermined portion in the circumferential direction of the holder body 5. The cover plate 8 also partly covers the coupling member 6. The holder body 5, the coupling member 6, and the cover plate 8 define an air duct 9. The air duct 9 extend from an area close to the fan 4 to the interior of the holder body 5 to guide air for cooling the interior of the blower motor 2.

The cover plate 8 has a dividing wall 40. The dividing wall 40, the holder body 5, and the coupling member 6 define an accommodation chamber 41 separated from the air duct 9. The accommodation chamber 41 accommodates a circuit board 42 that mounts a control circuit 42*a* for controlling the blower motor 2.

As shown in FIGS. 1 and 2(*a*), a portion of the coupling member 6 in the circumference direction projects radially outward. Specifically, a part of the coupling member 6 that corresponds to the cover plate 8 extends radially outward. At a part of the coupling member 6 that corresponds to the cover plate 8, a recess 10 that opens to the cover plate 8 is formed along the axial direction of the coupling member 6. The recess 10 is defined by an upper end wall 11, which is a part of the coupling member 6, and a circumferential wall 12. The circumferential wall 12 extends from three sides of the upper end wall 11, particularly, from the lateral sides and the radially outer side of the upper end wall 11. The circumferential wall 12 includes a pair of sidewalls 12*a* and an end wall 12*b*. The sidewalls 12*a* are located at the lateral sides of the upper end wall 11 and extend parallel to each other. The end wall 12*b* couples the radially outer ends of the sidewalls 12*a* to each other. A dividing wall 30 extends from the upper end wall 11 toward the cover plate 8 to divide the recess 10 at a center in the longitudinal direction of the recess 10. The dividing wall 30 couples the sidewalls 12*a* of the circumferential wall 12 to each other. The lower end surface of the dividing wall 30 is flush with the lower end of the circumferential wall 12.

An inlet cylinder 14 is formed in the upper end wall 11 in an area close to the radial outer end. The inlet cylinder 14 extends toward the opposite side of the cover plate 8, and defines an inlet 13. The inlet 13 opens in the same direction as the opening of the holder body 5 (upward as viewed in FIG. 1) to guide air from an exterior space above the motor holder 1 to the interior of the air duct 9.

As shown in FIG. 1, a cylindrical blocking wall 15, which function as a blocking portion, extends from a portion of the upper end wall 11 at an area corresponding to the inlet cylinder 14. The blocking wall 15 extends in a direction away from the inlet cylinder, or toward the cover plate 8. Although the blocking wall 15 is surrounded by the circumferential wall 12, the outer circumference of the blocking wall 15 is sufficiently separated from the circumferential wall 12. The blocking wall 15 surrounds the lower opening of the inlet 13. The cross-sectional area of the opening defined by the blocking wall 15 is greater than that of the inlet 13.

Figure 3:
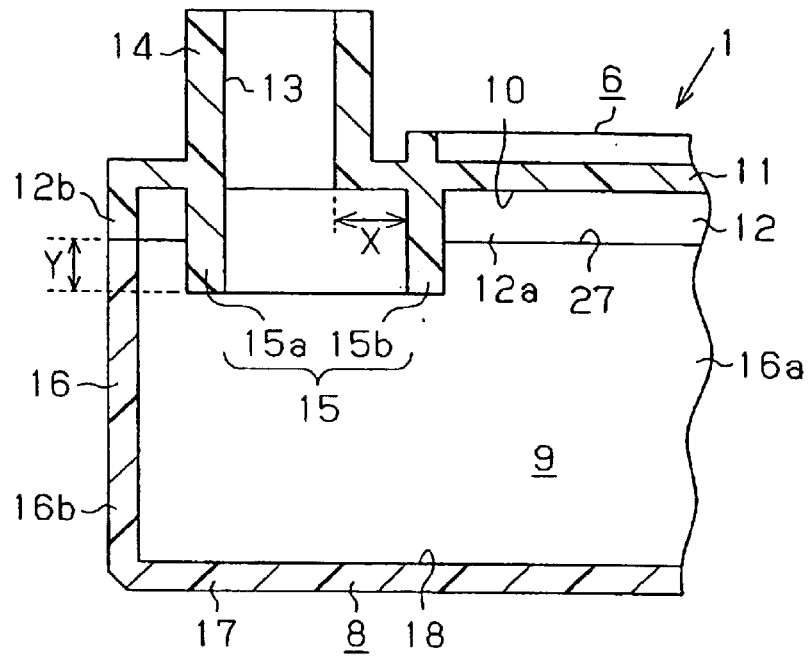
FIG. 3 is a partially cross-sectional view illustrating a section including an inlet of the motor holder shown in FIG. 1.

As shown in FIG. 3, the blocking wall 15 includes a first portion 15*a* and a second portion 15*b*. The first portion 15*a* is located at an outer position in the radial direction of the upper end wall 11 (leftward position as viewed in FIG. 3). The second portion 15*b* is located at an inner position in the radial direction of the upper end wall 11 (rightward position as viewed in FIG. 3). The blocking wall 15 is aligned with the inlet cylinder 14 at the first portion 15*a* and is displaced radially inward at the second portion 15*b* by a distance X. The distance X is determined such that air introduced through the inlet 13 collides with the inner surface of the second portion 15*b* of the blocking wall 15. Therefore, the inner wall of the second portion 15*b* of the blocking wall 15 blocks air flow from the inlet 13 to the air duct 9.

The axial length of the blocking wall 15 is determined such that the distal surface of the blocking wall 15 projects toward the cover plate 8 from the end surface of the circumferential wall 12 by a length Y.

The cover plate 8 is substantially L-shaped. Specifically, as shown in FIG. 2(*c*), the cover plate 8 includes a surrounding wall 16 and a bottom wall 17, which is integrally formed with the circumferential wall 16. The circumferential wall 16 includes a pair of L-shaped sidewalls 16*a* and a pair of end walls 16*b* coupling the sidewalls 16*a* to each other. The cover plate 8 opens to the coupling member 6 at a portion facing the coupling member 6, and opens to the holder body 5 at a portion facing the holder body 5. The distance between the sidewalls 16*a* is equal to the distance between the sidewalls 12*a* of the circumferential wall 12 at the coupling member 6. The dividing wall 40 is integrally formed with the sidewalls 16*a* to couple the sidewalls 16*a* to each other. The dividing wall 40 is L-shaped and includes a bottom wall 40*a* and a vertical wall 40*b*. The vertical wall 40*b* extends from an end of the bottom wall 40*a* and is perpendicular to the bottom wall 40*a*.

As shown in FIGS. 1 and 3, when the cover plate 8 is attached to the holder body 5 and the coupling member 6, the end surface of the circumferential wall 16 of the cover plate 8 contacts the end surface of the circumferential wall 12 of the coupling member 6 and the outer surface of the holder body 5. Further, the end surface of the vertical wall 40b of the dividing wall 40 provided on the cover plate 8 contacts the end surface of the dividing wall 30 of the coupling member 6, and the end surface of the bottom wall 40a of the dividing wall 40 contacts the outer surface of the holder body 5. As a result, the air duct 9 and the accommodation chamber 41 are independently defined. Contacting portions of the cover plate 8 and the coupling member 6 form a first boundary 27, and contacting portions of the cover plate 8 and the holder 5 form a second boundary 28. That is, the boundaries 27, 28 are located in portions of the motor holder 1 that define the air duct 9 and the accommodation chamber 41.

The air duct 9 is substantially shaped as a crank as shown in FIG. 1, and includes a first passage 18, a second passage 19, and a third passage 20. The first passage 18 extends from the inlet 13 to the outer surface of the holder body 5 along a radial direction of the holder body 5 (in a direction perpendicular to the axis of the holder body 5). The second passage 19 extends from the end of the first passage 18 to the bottom of the holder body 5 on the outer circumference of the holder body 5 along the axis of the holder body 5. The third passage 20 extends from the end of the second passage 19 to a communication hole 5a along the axial direction of the holder body 5. The communication hole 5a will be described below.

The communication hole 5a is formed in a part of the circumference of the holder body 5 that is close to the bottom and covered with the cover plate 8. The communication hole 5a connects the air duct 9 with the interior of the holder body 5.

The blower motor 2 is a direct-current motor, and includes a cup-shaped yoke 21, an armature core 22, a commutator 23, and a pair of brushes 24 for supplying electricity. The yoke 21 supports the rotary shaft 3. The armature core 22 and the commutator 23 are fixed to the rotary shaft 3. The brushes 24 slide on the commutator 23. The bottom of the yoke 21 is fixed to the bottom of the holder body 5 with a screw 25. The outer circumference of the yoke 21 is supported by the inner circumference of the holder body 5 with rubber members (not shown). The number of the rubber members is, for example, three. Alternatively, the yoke 21 may be press fitted to the holder body 5. In this case, projecting ribs (not shown) extending along the axial direction are preferably formed either on the outer circumference of the yoke 21 or on the inner circumference of the holder body 5. A ventilation hole 26 is formed in a part of the bottom of the yoke 21 that corresponds to the communication hole 5a.

As shown by an alternate long and two short dashes line in FIG. 1, the fan 4 is fixed to the distal portion of the rotary shaft 3 that projects from the yoke 21. In this embodiment, the radius of the fan 4 is substantially equal to the length from the axis of the holder body 5 to the fixing ring 7. The fan 4 is of a conventional type and creates an upward air flow as viewed in FIG. 1 when rotated.

The circuit board 42 is fixed to the bottom wall 40a of the dividing wall 40 and is located in the accommodation chamber 41. The control circuit 42a mounted on the circuit board 42 includes a plurality of electric elements. Electricity is supplied to the blower motor 2 from the outside of the blower motor device through the control circuit 42a. That is, the control circuit 42a supplies electricity to the brushes 24.

The electricity is then supplied to the armature core 23 from the brushes 24 through the commutator 23, which rotates the armature core 22 together with the rotary shaft 3. The control circuit 42a controls electricity supplied to the motor 2, thereby adjusting the rotation speed of the rotary shaft 3.

The blower motor device is mounted on the vehicle by fixing the fixing ring 7 to a predetermined part of the vehicle. The blower motor device is installed such that the fan 4 faces upward as shown in FIG. 1.

When the blower motor 2 is activated and the fan 4 rotates, air is sent from an area above the fan 4 to an are below the fan 4. At this time, upward air flow through the holes 6a formed in the coupling member 6 is created. Another upward air flow along the fan 4 is created in the holder body 5. Specifically, air is guided to the interior of the holder body 5 through the communication hole 5a formed in a lower portion of the holder body 5, then moves in the interior of the holder body 5 along the axial direction to the fan 4.

Air moves in the space between the holder body 5 and the yoke 21 and through the interior of the yoke 21 along the axial direction, and absorbs heat of the blower motor 2 produced in and about the yoke 21. That is, air flow in the holder body 5 when the fan 4 is rotating functions as cooling air that prevents the blower motor 2 from being excessively heated.

The cooling air is supplied to the interior of the holder body 5 from the inlet 13 through the air duct 9. That is, when the fan 4 is rotated, air flow from the inlet 13 to the communication hole 5a is created in the air duct 9.

At this time, droplets of washing liquid and droplets due to condensation collected on the inner surface of the inlet cylinder 14 are moved downward by the gravity and the air flow. However, since the blocking wall 15 projects downward from the lower opening of the inlet 13, the droplets are prevented from moving along the air duct 9 and reaching the contacting portions of the coupling member 6 and the cover plate 8 (the first boundary 27). That is, the lower end of the blocking wall 15 is located below the first boundary 27. Therefore, droplets that have reached the lower end of the blocking wall 15 along the inner surface of the inlet cylinder 14 and the inner surface of the blocking wall 15 are located at a position lower than the first boundary 27. Thus, even if blown by air flow in the air duct 9, the droplets at the lower end of the blocking wall 15 cannot reach the first boundary 27, which is located upward of the droplets.

As shown in FIG. 3, an inner surface of the second portion 15b of the blocking wall 15 that is located inward along the radial direction of the motor holder 1 is closer to the holder body 5 than an inner surface of the inlet 13 that is located inward along the radial direction of the motor holder 1 by the distance X. Therefore, air that is introduced from the inlet 13 to the interior of the blocking wall 15 readily flows toward the holder body 5. However, the air collides with the inner surface of the second portion 15b of the blocking wall 15, which reduces the momentum of the air flow. Therefore, even if air rushes through the inlet 13, the momentum of the air flow is reduced and droplets are prevented from being brought to the interior of the holder body 5 by the air flow. Water contained in the air collides with and collects on the inner surface of the second portion 15b. Accordingly, air containing water is prevented from being guided to the interior of the holder body 5.

The distance X and the axial measurement of the blocking wall 15 are determined not to excessively hinder air flow from the inlet 13 to the air duct 9. Therefore, although air collides with the inner surface of the blocking wall 15, the efficiency of air intake is not excessively lowered, and the cooling effect of the motor 2 is not adversely affected.

If droplets at the lower end of the blocking wall 15 grow bigger, the droplets falls directly downward and collect on the bottom wall 17 of the cover plate 8. Since the collected droplets are lower than the first boundary 27, the droplets will not reach the first boundary 27. Also, the distance between points to which the droplets fall and the contacting portions of the cover plate 8 and the holder body 5 (the second boundary 28) is approximately equal to the radius of the fan 4. The distance is sufficiently long to allow the droplets to evaporate before reaching the second boundary 28. Thus, droplets fallen to the cover plate 8 evaporate before reaching the second boundary 28, and do not reach the second boundary 28 and the interior of the blower motor 2.

The blocking wall 15 is sufficiently spaced from the circumferential wall 12 of the coupling member 6. Therefore, even if droplets are blown radially outward from the lower end of the blocking wall 15, the blown droplets fall due to the gravity before reaching the circumferential wall 12 and do not reach the first boundary 27.

This embodiment provides the following advantages.

(1) The blocking wall 15 surrounding the inlet 13 extends from the inner surface of the air duct 9 toward the interior of the air duct 9. Even if droplets collect on the inner surface of the inlet 13, the blocking wall 15 prevents the droplets from reaching the inner surface of the air duct 9. The droplets therefore will not reach the first boundary 27 between the coupling member 6 and the cover plate 8. Therefore, a problem that droplets at the first boundary 27 ooze out from the motor holder 1 due to a capillary phenomenon is prevented. Also, no droplets reach the interior of the accommodation chamber 41 through the first boundary 27. The circuit board 42 in the accommodation chamber 41 is prevented from being wet.

(2) The outer surface of the blocking wall 15 is entirely separated from the circumferential wall 12 of the coupling member 6. Therefore, even if droplets is blown radially outward from the lower end of the blocking wall 15, the blown droplets will not reach the first boundary 27.

(3) The lower end of the blocking wall 15 is located at a position lower than the first boundary 27. Therefore, droplets blown from the lower end of the blocking wall 15 is further reliably prevented from reaching the first boundary 27.

(4) The blocking wall 15 protrudes toward the interior of the air duct 9. The inner surface of the second portion 15b of the blocking wall 15 is closer to the holder body 5 than the inner surface of the inlet 13 by the distance X. By adjusting the projecting amount of the blocking wall 15 and the distance X, the momentum of the air flow is adequately suppressed while preventing the air intake efficiency to the air duct 9 from being degraded. Therefore, water is prevented from being carried to the interior of the holder body 5 by air flow, and the blower motor 2 is adequately cooled.

(5) The distance from the position of the cover plate 8 that is substantially directly below the inlet 13 to the second boundary 28 is approximately equal to the radius of the fan 4. Droplets fallen to a part of the cover plate 8 directly below the inlet 13 evaporate before reaching the second boundary 28. Therefore, malfunctions caused by droplets reaching the second boundary 28 is prevented. For example, a problem that droplets at the second boundary 28 ooze out from the motor holder 1 due to a capillary phenomenon is prevented.

Also, droplets are prevented from entering the interior of the blower motor 2.

The present invention may be embodied as follows.

Figure 4:
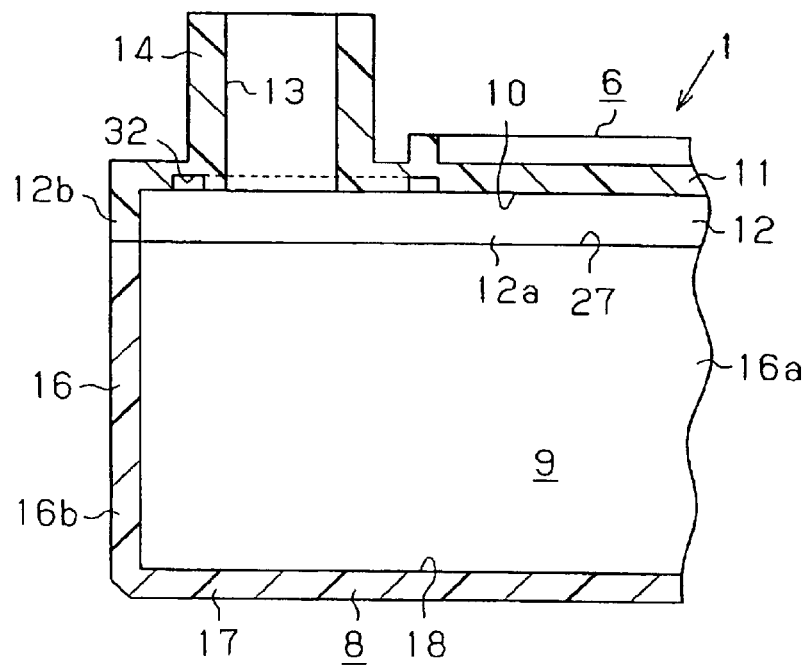
FIG. 4 is a cross-sectional view illustrating a section including an inlet of a motor holder according to another embodiment.
Figure 5:
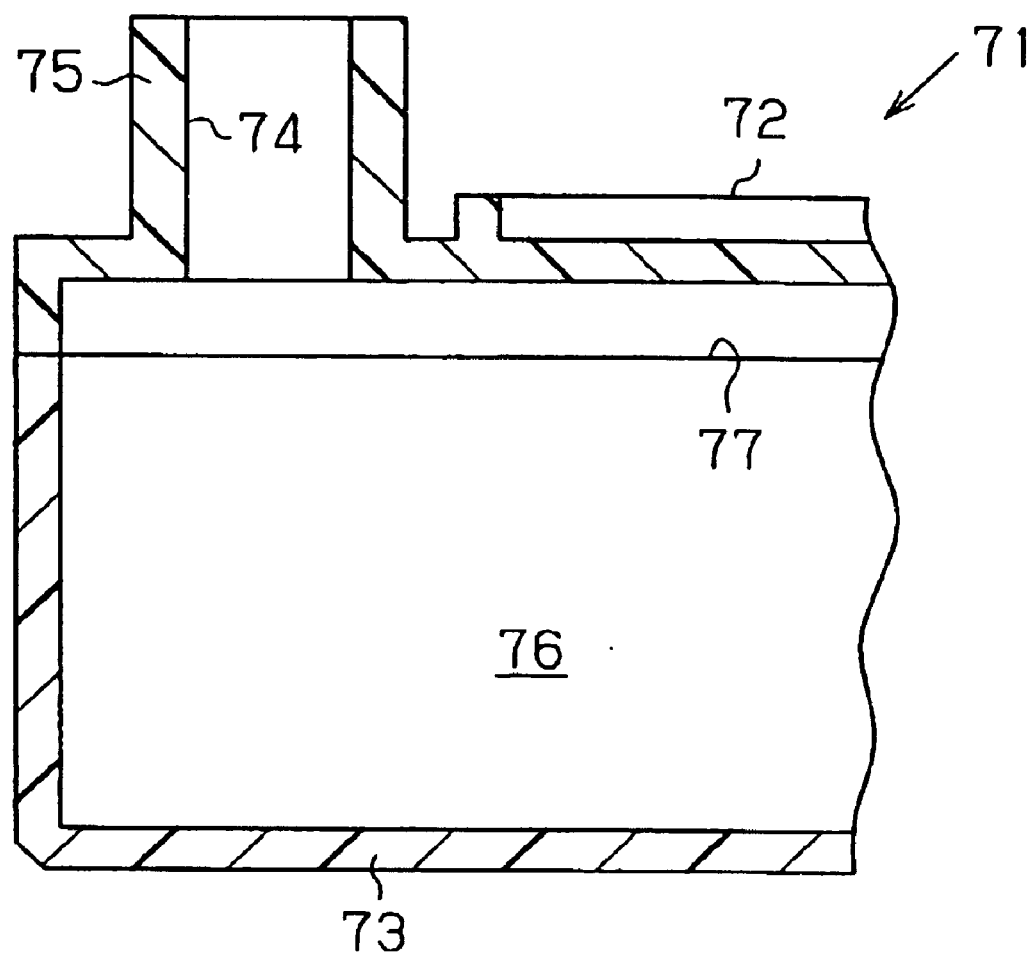
FIG. 5 is a cross-sectional view illustrating a section including an inlet of a prior art motor holder.

In the illustrated embodiment, the blocking wall 15, which protrudes from the inner surface of the air duct 9 toward the interior of the air duct 9, is used as a blocking portion. However, as long as droplets are prevented from the inlet 13 to the first boundary 27, any structure other than the blocking wall 15 may be adopted. For example, as shown in FIG. 4, a blocking groove 32, which functions as a blocking portion, may be formed about the inlet 13.

The blocking groove 32 is formed by annularly notching the inner surface of the air duct 9, specifically, the lower surface of the coupling member 6 that faces the air duct 9, such that the groove 32 surrounds the lower opening of the inlet 13. The blocking groove 32 is separated from the first boundary 27 with respect to the radial direction of the blocking groove 32.

Since the blocking groove 32 is formed by recessing the lower surface of the coupling member 6 in an antigravity direction, droplets cannot move from the lower opening beyond the blocking groove 32. Therefore, droplets are prevented from reaching the first boundary 27, which is outside of the area surrounded by the blocking groove 32. Therefore, like the embodiment of FIGS. 1 to 3, the embodiment shown in FIG. 4 does not have problems caused by droplets reaching the first boundary 27.

In FIG. 1, the ventilation hole 26 is formed in the bottom of the yoke 21 of the blower motor 2. However, the ventilation hole 26 may be omitted. In this case, cooling air is guided to the space between the inner circumference of the holder body 5 and the outer circumference of the yoke 21. This cools the yoke 21 and therefore prevents the blower motor from being heated.

The blower motor 2 of FIG. 1 is a direct-current motor that includes the electricity supplying brushes 24. However, the present invention may be applied to other type of motors such as brushless motors.

The cross-sectional shape of the inlet 13 may be different from the illustrated one.

As long as the blocking wall 15 surrounds the inlet 13, the blocking wall 15 need not be cylindrical.

As shown in FIG. 3, the lower surface of the blocking wall 15 is displaced downward from the boundary 27 by the length Y. The length Y may be varied as necessary in a range where droplets do not move from the lower end of the blocking wall 15 to the first boundary 27.

The cover plate 8 need not be fixed with a screw. For example, the cover plate 8 may be engaged with the holder body 5 and the coupling member 6.

As long as an inlet is surrounded by a blocking portion such that droplets do not reach the boundary between the coupling member and the cover plate, the shapes of the coupling member and the plate and the shape of the air duct 9 are not limited to the illustrated ones.

The coupling member 6, or the flange 6, need not be shaped as a disk as long as the coupling member 6 extend radially outward at least from a part of the outer circumference of the holder body 5.

The present examples and embodiments are to be considered as illustrative and not restrictive and the invention is not to be limited to the details given herein, but may be modified within the scope and equivalence of the appended claims.

What is claimed:

1. A vehicle blower motor device comprising:
   a motor; and
   a holder, wherein the holder includes:
   a holder body, which accommodates and holds the motor;
   a flange extending radially outward from the holder body; and
   a cover plate, wherein the cover plate is attached to the flange and the holder body such that the cover plate is located below the flange, wherein a first boundary is formed between the cover plate and the flange, and wherein a second boundary is formed between the cover plate and the holder body,
   wherein the holder body, the flange, and the cover plate define an air duct, wherein the flange has an inlet, wherein the inlet connects the air duct, which is located below the flange, with an outside space that is located above the flange, wherein air is guided from the inlet to the interior of the holder body through the air duct to cool the motor, and
   wherein a blocking portion is provided in the air duct and between the inlet and the first boundary, wherein the blocking portion prevents liquid collected on the inlet from reaching the first boundary.

2. The device according to claim 1, further comprising a control circuit for controlling the motor, wherein the control circuit is accommodated in the holder.

3. The device according to claim 2, wherein the holder has an accommodation chamber for accommodating the control circuit, and wherein part of the first boundary is located in a portion of the holder that defines the accommodation chamber.

4. The device according to claim 3, wherein the blocking portion prevents liquid collected on the inlet from reaching the accommodation chamber along the first boundary.

5. The device according to claim 1, wherein the blocking portion is separated from the first boundary.

6. The device according to claim 1, wherein the blocking portion includes a cylindrical blocking wall that surrounds the inlet.

7. The device according to claim 6, wherein the blocking wall protrudes from the lower surface of the flange, which faces the air duct, toward the interior of the air duct.

8. The device according to claim 7, wherein the blocking wall extends further downward beyond the first boundary.

9. The device according to claim 7, wherein a part of the inner surface of the blocking wall that is close to the holder body is closer to the holder body than that of the inlet.

10. The device according to claim 7, wherein the arrangement of the blocking wall relative to the inlet is determined such that air introduced to the air duct from the inlet collides with the blocking wall.

11. The device according to claim 7, wherein the cross-sectional area of an opening defined by the blocking wall is greater than that of the inlet.

12. The device according to claim 1, wherein the blocking portion includes a blocking groove, and wherein the blocking groove is formed in the lower surface of the flange, which faces the air duct, such that the blocking groove surrounds the inlet.

13. A holder in a vehicle blower motor device, comprising:
    a holder body, which accommodates and holds a motor;
    a flange extending radially outward from the holder body;
    a cover plate, wherein the cover plate is attached to the flange and the holder body such that the cover plate is located below the flange, wherein a first boundary is formed between the cover plate and the flange, and wherein a second boundary is formed between the cover plate and the holder body;
    an air duct defined by the holder body, the flange, and the cover plate, wherein the flange has an inlet, wherein the inlet connects the air duct, which is located below the flange, with an outside space that is located above the flange, wherein air is guided from the inlet to the interior of the holder body through the air duct to cool the motor; and
    a blocking portion, which is provided in the air duct and between the inlet and the first boundary, wherein the blocking portion prevents liquid collected on the inlet from reaching the first boundary.

14. The holder according to claim 13, wherein the holder accommodates a control circuit for controlling the motor.

15. The holder according to claim 14, wherein the holder has an accommodation chamber for accommodating the control circuit, and wherein part of the first boundary is located in a portion of the holder that defines the accommodation chamber.

16. The holder according to claim 15, wherein the blocking portion prevents liquid collected on the inlet from reaching the accommodation chamber along the first boundary.

17. The holder according to claim 13, wherein the blocking portion is separated from the first boundary.

18. The holder according to claim 13, wherein the blocking portion includes a cylindrical blocking wall that surrounds the inlet, and wherein the blocking wall protrudes from the lower surface of the flange, which faces the air duct, toward the interior of the air duct.

19. The holder according to claim 18, wherein the blocking wall extends further downward beyond the first boundary.

20. The holder according to claim 13, wherein the blocking portion includes a blocking groove, and wherein the blocking groove is formed in the lower surface of the flange, which faces the air duct, such that the blocking groove surrounds the inlet.

* * * * *